United States Patent [19]

Traino et al.

[11] Patent Number: 4,620,237
[45] Date of Patent: Oct. 28, 1986

[54] FAST SCAN JITTER MEASURING SYSTEM FOR RASTER SCANNERS

[75] Inventors: James C. Traino, Fairport; Douglas L. Keene, Central Valley, both of N.Y.

[73] Assignee: Xerox Corporation, Stamford, Conn.

[21] Appl. No.: 663,634

[22] Filed: Oct. 22, 1984

[51] Int. Cl.$^4$ .......... H04N 1/23; H04N 1/36; H04N 1/29; G02B 26/08
[52] U.S. Cl. .................. 358/300; 358/264; 369/118; 350/6.8
[58] Field of Search ........... 358/206, 264, 296, 298, 358/300; 350/6.8; 250/214 C; 355/8; 369/118, 119; 346/108

[56] References Cited

U.S. PATENT DOCUMENTS

| | | | |
|---|---|---|---|
| 3,812,371 | 5/1974 | Chin | 346/108 X |
| 3,913,076 | 10/1975 | Lehureau et al. | 369/118 X |
| 4,019,186 | 4/1977 | Dressen et al. | 346/108 |
| 4,143,403 | 3/1979 | Ohnishi | 358/206 |
| 4,195,316 | 3/1980 | Sansome | 358/285 |
| 4,314,154 | 2/1982 | Minoura et al. | 250/235 |
| 4,318,582 | 3/1982 | Minoura et al. | 350/6.6 |
| 4,327,959 | 5/1982 | Minoura et al. | 350/6.8 X |

FOREIGN PATENT DOCUMENTS 150365   9/1983   Japan ................... 358/206

Primary Examiner—E. A. Goldberg
Assistant Examiner—Patrick W. Foster
Attorney, Agent, or Firm—Frederick E. McMullen

[57] ABSTRACT

A system for detecting and measuring fast scan jitter having first and second photosensors combined in a unitary detector positionable in the path of a scanning beam; means for generating a packet of test pixels for modulating the scanning beam for jitter through a succession of scan lines; said first and second photosensors outputting signal pulses representing the intensity of said scanning beam following modulation by said test pixels; a differential integrator for integrating the signal pulse outputs of said first and second photosensors with one another to provide a test signal for each line scanned; a filter for smoothing said test signal, an amplifier for amplifying said test signal, a peak to peak detector for comparing the test signal of one scan line with the test signal from the succeeding scan lines to provide a jitter signal where said test signals are different; and a meter for converting said jitter signal to a visual readout.

10 Claims, 10 Drawing Figures

FAST SCAN JITTER MEASURING SYSTEM FOR RASTER SCANNERS

The invention relates to raster output scanners, and more particularly, to a system for measuring fast scan jitter in raster output scanners both during manufacturing and in the field.

Pixel registration errors in raster output scanners or ROS's as they are sometimes called, require detection and quanification during manufacturing of the scanner and later when the scanner is in service. Such errors when in the fast scan direction are usually indicative of an underlying fault or marginal failure in the scanner with the result that copy quality degrades. The usual scanner failures which are evidenced by fast scan jitter are velocity variations in the scanner scanning element, scratched or dirty optical elements, misalignment of optical components, scan detection failures, and pixel clock circuit failures. If fast scan jitter could be readily detected and quantified, such scanner failures could be more readily detected, identified, and corrected both while the scanner is being manufactured and later in the field when the scanner is in service.

The current technique for detecting and measuring fast scan jitter is primarily limited to laboratory environments and requires a laboratory quality oscilloscope to measure the difference in pulse length between two digital signals on the pixel clock circuit board. However, since an oscilloscope is usually not a standard manufacturing or field engineering tool, this measuring process is not practical and there is a need for a technique to measure fast scan jitter without the need of an oscilloscope. The use of an oscilloscope for this purpose requires a trained operator. Further, the measurement is subjective and is affected by operator read error.

The invention relates to a system for detecting and measuring fast scan jitter as the scanning beam of a raster output scanner scans across a recording member, the scanner including means for modulating the beam in accordance with an image signal input, the combination comprising: beam detecting means including first and second photosensors in the path of the scanning beam, the first and second photosensors each being adapted to produce a signal pulse as the scanning beam scans thereacross, the signal pulses being substantially equal in the absence of fast scan jitter; means for integrating the signal pulses to provide a test signal proportional to the difference between the signal pulses on each sweep of the beam; and peak detecting means for comparing the peak to peak variation between the test signals to provide a fast scan jitter signal.

The invention further relates to a method for detecting and measuring fast scan jitter in a raster output scanner having a scan beam modulated in accordance with a pixel input and means for scanning the modulated beam across a recording member a scan line at a time to provide an image corresponding to the pixel input, comprising the steps of: generating a predetermined number of test signals; repeatedly modulating the beam in response to the test signals to produce a preset number of test pixels along successive scan lines; sensing the intensity of the test pixels at two predetermined points along the scan line and producing first and second signal pulses in response thereto; integrating the first and second signal pulses with one another to provide a test signal proportional to the difference between the first and second signal pulses; and comparing the maximum high test signal obtained with the maximum low test signal obtained over a plurality of scan lines to detect and provide a measurement of fast scan jitter.

IN THE DRAWINGS

Figure 2:
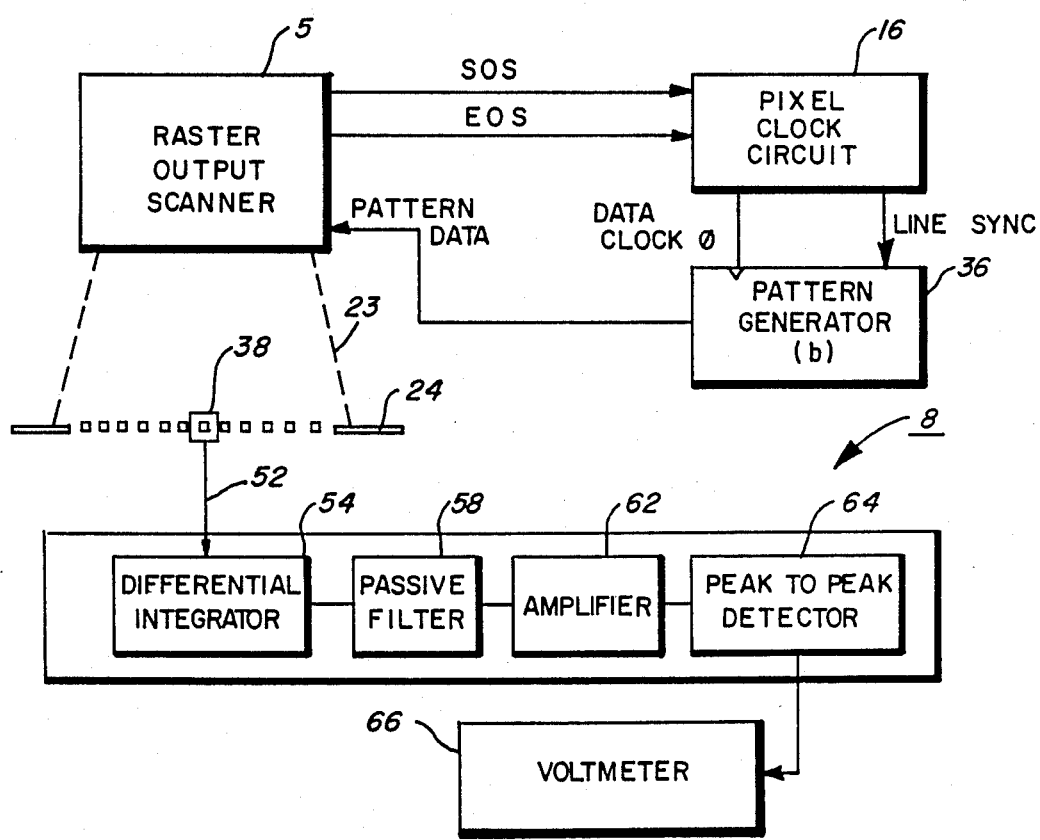
FIG. 2 is a schematic view of the jitter measuring system of the present invention coupled to the scanner shown in FIG. 1 to measure fast scan jitter.
Figure 5A:
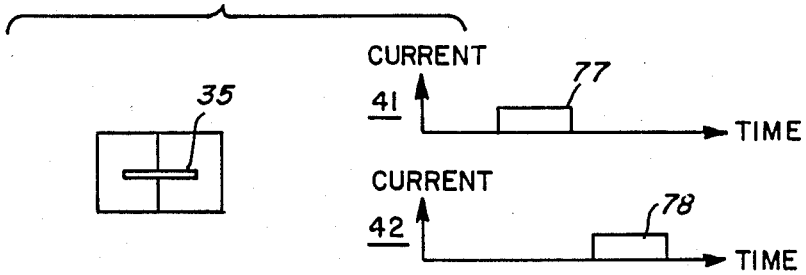
Figure 5B:
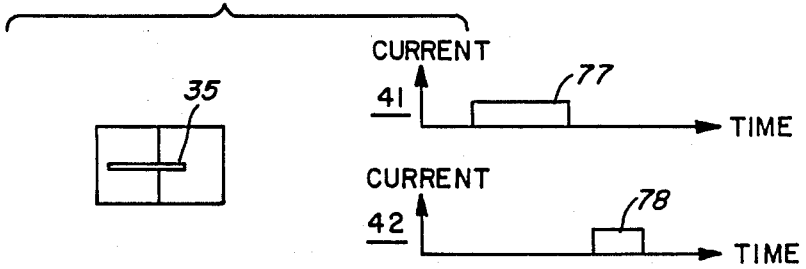
Figure 5C:
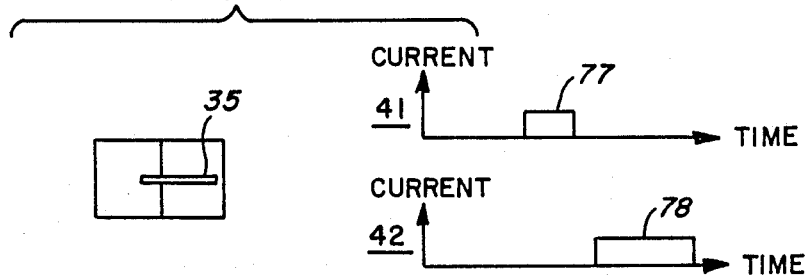
Figure 6A:
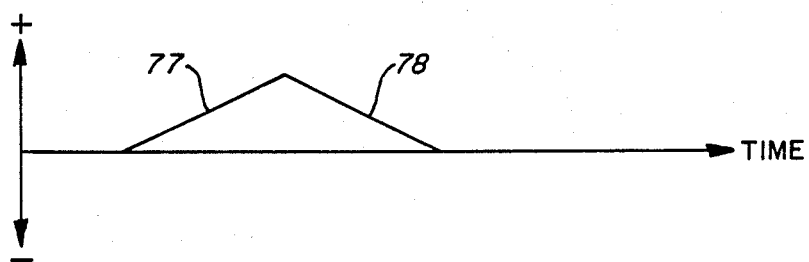
Figure 6B:
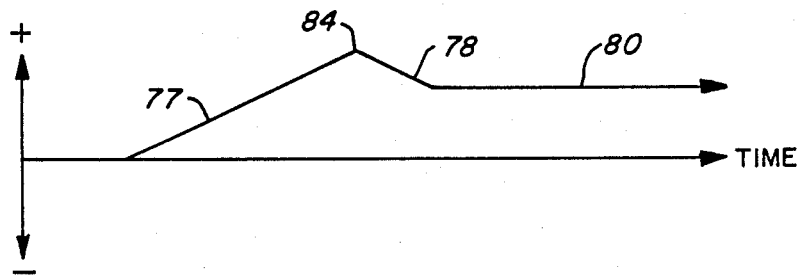
Figure 6C:
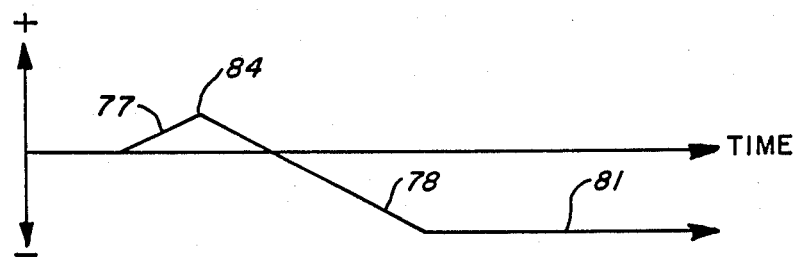

FIGS. 5a 5b, and 5c are views showing various scan line jitter conditions as determined by the jitter measuring circuit shown in FIG. 2, FIG. 5a representing a no jitter condition while FIGS. 5b and 5c represent jitter conditions; and FIGS. 6a, 6b and 6c are graphical representations of current pulses representing the jitter conditions shown in FIGS. 5a, 5b, and 5c respectively.

Figure 1:
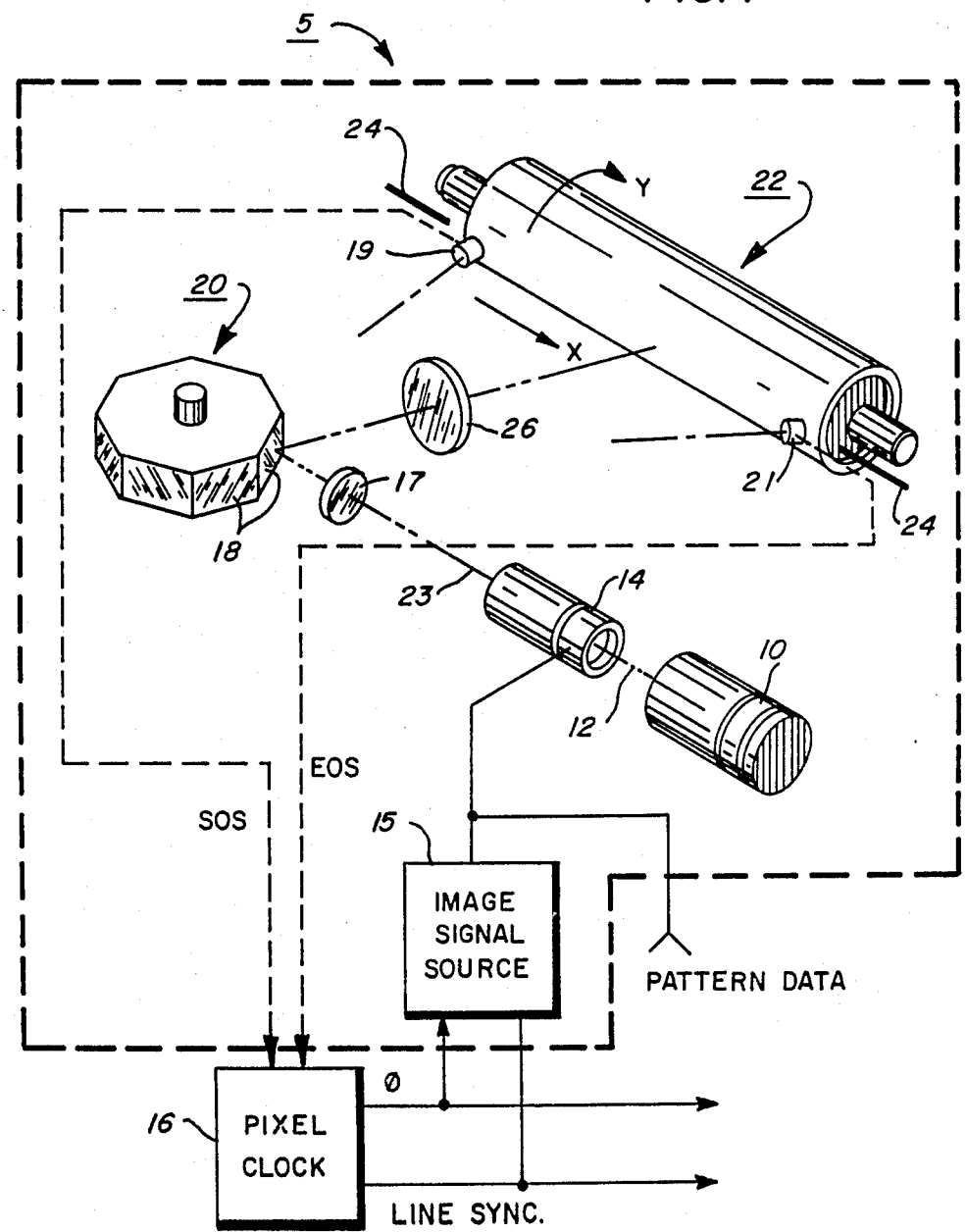
FIG. 1 is a schematic view of a raster output scanner of the type subject to fast scan jitter.

Referring to FIG. 1 of the drawings, there is shown an exemplary raster output scanner or ROS, designated generally by the numeral 5, with which the jitter measuring system 8 of the present invention may be used. Scanner 5 includes a suitable source of high intensity light such as laser 10, the output beam 12 of which is modulated by a suitable modulating device such as acousto-optic modulator 14 in accordance with an image signal input from image signal source 15 to provide an imaging beam 23. The image signals are clocked out from image signal source 15 a line at a time by the clock signal output $\phi$ of pixel clock 16, clock 16 being triggered in response to the clock start and stop signal outputs of Start-Of-Scan (SOS) and End-Of-Scan (EOS) detectors 19, 21 respectively. SOS and EOS detectors 19, 21 are disposed in the scan path of the scan beam 23 to define the start and end of the image line in the fast scan direction.

Image signal source 15 may comprise any suitable source of image signals, such as a communication channel, memory, raster input scanner, etc. The imaging beam 23 is focused by suitable lens means 17 onto the mirrored surfaces or facets 18 of a scanning element shown here in the form of a rotating polygon 20. Polygon 20 scans the imaging beam 23 across a recording member such as the previously charged photoreceptor 22 of a xerographic reproduction system lying in the image plane 24 of scanner 5 to expose the charged photoreceptor line by line and create a latent electrostatic image representative of the image signal input from image signal source 15. Polygon 20 scans beam 23 in the fast scan or X direction across photoreceptor 22 while the photoreceptor is moved concurrently in the slow scan or Y direction at a suitable rate. An imaging lens 26 focuses the imaging beam 23 onto photoreceptor 22.

The latent electrostatic image created on photoreceptor 22 by the imaging beam 23 is developed by a suitable toner at a developing station (not shown), the developed image being transferred to a suitable copy substrate such as a copy sheet at a transfer station (not shown). The copy sheet is thereafter fused or fixed at a fusing station (not shown) and the finished copy discharged into an output device such as a sorter (not shown). Following transfer of the developed image, photoreceptor 22 is cleaned at a cleaning station (not shown) and uniformly charged at a charging station (not shown) in preparation for imaging.

As the imaging beam 23 is scanned across photoreceptor 22, a succession of dot-like exposures (termed pixels herein) corresponding to the image signal input are made on photoreceptor 22. Each pixel has a prescribed position on photoreceptor 22 as determined by the start of scan signal output of SOS detector 19, the velocity at which beam 23 is swept or scanned across photoreceptor 22 by polygon 20, and the pixel clock rate $\phi$ at which the image signals are input to modulator 14. These factors are correlated so that each image line is composed of a predetermined number of pixels selected to provide a desired image resolution in the fast scan or X direction.

In order to assure desired copy quality and prevent image blur or distortion, each pixel in each succeeding image line must be positioned at the same point on photoreceptor 22. An error in the position or placement of a pixel along the scan line in the X direction is referred to herein as fast scan jitter. Excessive jitter is indicative of marginal failures in scanner 5 such as large velocity variations in the rotational speed of polygon 20, scratched or dirty or misaligned optical elements, failure of SOS and EOS detectors 19,21, failure of pixel clock 16, etc. As will appear, the jitter measuring system of the present invention facilitates detection of fast scan jitter and consequent detection and identification of the failure in scanner 5 precipitating such jitter, both during manufacture of scanner 5 and in the field.

Figure 3:
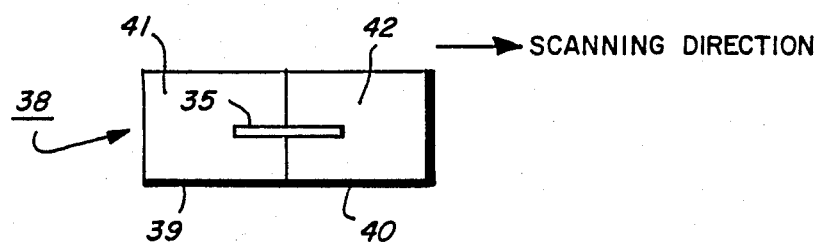
FIG. 3 is an enlarged schematic view of the dual detector photodiode used with the jitter measuring system shown in FIG. 2.

Referring to FIGS. 2 and 3, the jitter measuring system 8 of the present invention employs a packet 35 of test pixels which are generated by suitable means such as test pattern generator 36. A pixel packet 35 may for example comprise 4 pixels. A dual detector photodiode 38, each segment 39, 40 of which has a sensor element 41, 42, is mounted in the focal plane 24 in the scan path of imaging beam 23. Photodiode 38 is positioned at a preset point along the scan path such that ordinarily, when no jitter is present, one-half of the test pixels in packet 35 are projected onto the sensor element 41 with the remaining one-half of the pixels on sensor element 42. Accordingly, in the example shown, two pixel bits would be projected onto segment 39 and two pixel bits onto segment 40 when no scan line jitter is present.

Figure 4:
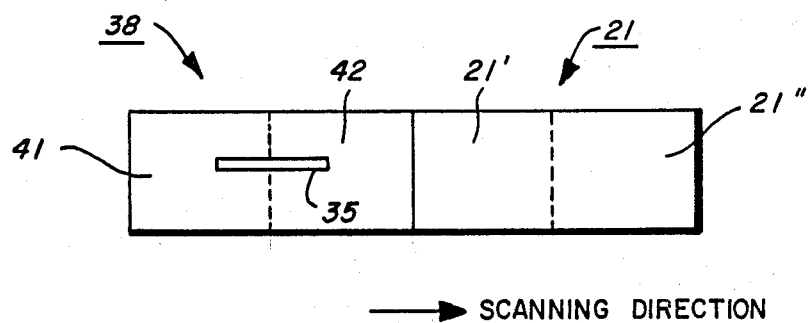
FIG. 4 is an enlarged schematic view of the dual detector photodiode of FIG. 4 combined with the scanner End Of Scan detector in a unitary assembly.

Jitter measuring system 8 may either be built into and made integral with scanner 5 or employed as a separate unit which is coupled to scanner 5 when it is desired to check for fast scan jitter. In the event that jitter measuring system 8 is built into scanner 5, dual detector photodiode 38 of jitter measuring system 8 is preferably integrated with EOS detector 21 as shown in FIG. 4. There, sensor elements 41, 42 of dual detector photodiode 38 are disposed in side by side relation with the pair of photodiode type sensor elements 21', 21" of EOS detector 21 on a common chip. Sensor elements 41, 42 of photodiode 38 are located on the upstream side of EOS sensor elements 21', 21" to detect imaging beam 23 before beam 23 impinges on EOS sensor elements 21', 21". By this construction, photodiode 38 is located in a predetermined position along the fast scan axis, i.e. just before EOS detector 21, and at a point outside the normal imaging area of photoreceptor 22 so as not to interfere with the imaging process.

Where jitter measuring system 8 comprises a separate unit, it will be understood that suitable means (not shown) for locating dual detector photodiode 38 at some point along the scan path of imaging beam 23 and for electrically coupling the unit to scanner 5 would be provided.

The output of sensor elements 41, 42 is fed through line 52 to a suitable differential integrator 54 which may for example comprise a current mode operational amplifier used as a differential current controlled voltage source to provide a differential ramp generator circuit. An interstage filter 58 functions to remove undesired voltage peaks from the output of integrator 54 while retaining any offset voltage levels indicative of jitter that may be present. Because of the low voltage level available at the output of integrator 54, an amplifier 62 is provided to raise the signal output of integrator 54 to a level suitable for peak detection by peak detector circuit 64. Peak detector circuit 64 functions to acquire and store any offset voltage levels that are detected and to output a difference signal to a suitable meter such as voltmeter 66.

OPERATION

In operation, and referring particularly to FIGS. 1-6 of the drawings, when it is desired to check fast scan jitter, pattern generator 36 is actuated to output packets 35 of pixels to modulator 14 a line at a time. Accordingly, as the imaging beam 23 is swept across the image plane 24, the beam 23 is modulated by modulator 14 in accordance with the image signal input represented by pixel packet 35. Presuming there is no jitter, the pixel bits of packet 35 are evenly imaged on both segments 39, 40 of the photodiode 38, photodiode 38 having been previously aligned so that nominally where there is no jitter, equal amounts of light energy from beam 23 will fall on each sensor element 41, 42 of photodiode 38. In that circumstance, each sensor element 41, 42 will output a current pulse 77, 78 having an amplitude proportional to the intensity of the beam 23 incident on the sensor element 41, 42, the pulse duration being equal to the dwell time of the beam on the sensor element.

In the example shown in FIGS. 5a and 6a, no fast scan jitter is presumed. Accordingly, sensor elements 41, 42 each receive equal light energy with the result that the current pulses 77, 78 output by the sensor elements 41, 42 are equal.

Where fast scan jitter is present, the packet 35 of pixel bits imaged onto the photodiode 38 is displaced either ahead or behind the dividing line between photodiode segments 39, 40. As a result, the current pulses 77, 78 output by sensor elements 41, 42 are unequal. The relative displacement of the pixel bits from the nominal no jitter position where the sensor elements 41, 42 receive equal illumination to a position where the light illumination received by the sensor elements 41, 42 is unequal (i.e. FIGS. 5b, 5c and 6b, 6c) is quantified by taking the difference between the current pulses 77, 78 and converting the difference into a representative voltage which is then read by voltmeter 66 as a measure of fast scan jitter.

Referring particularly to FIGS. 5a and 6a, as the scan beam 23 traverses sensor element 41 of photodiode 38 for the first two bits of pixel packet 35, the current pulse 77 output by sensor element 41 is ramped upward over the two bit span until the beam leaves sensor 41. Thereafter, the beam 23 impinges on sensor element 42 for the next two pixel bits and the current pulse 78 output by sensor element 42 is ramped down over the next two bit span. The difference between current pulses 77, 78 is zero and accordingly no measurable jitter exists.

Where the packet 35 of pixel bits is displaced one bit to the left on the first scan as shown in FIGS. 5b and 6b, the current pulse output 77 of sensor element 41 is ramped up for 3 bits while the current pulse 78 output by sensor element 42 is ramped down for 1 bit creating a momentary positive output voltage 80. If on a subsequent scan, the packet 35 of pixel bits is displaced one bit to the right as shown in FIGS. 5c and 6c, the current pulse 77 output by sensor element 41 is ramped up for 1 bit while the current pulse 78 output of sensor element 42 is ramped down for 3 bits creating a momentary negative voltage output 81. By subtracting the voltage outputs 80, 81 from one another, a measure of the displacement of the four bit pixel packet 35 across the sensor elements 41, 42 of photodiode 38 is obtained.

As particularly seen in FIGS. 6b and 6c, in order to obtain output voltages 80, 81 in suitable condition for differencing, the voltage peaks 84 are removed by filter 58. The voltage outputs 80, 81 are amplified by amplifier 62 and input to peak detector circuit 64. Preferably, a plurality of test scans, which may be the equivalent to one or more pages, are made and the maximum or peak positive and negative voltage outputs 80, 81 that are acquired stored by peak detection circuit 64. The peak outputs 80, 81 that are obtained are compared with one another by peak detector circuit 64 to provide a difference signal to voltmeter 66, which may be read either during or following the test scans to provide an indication of the fast scan jitter detected by jitter measuring system 8. It will be understood that where fast scan jitter is detected, suitable system diagnostics (not shown) may be used to identify the failing scanner component or components responsible so that repair, replacement, and/or adjustment can be made to remove or reduce fast scan jitter to an acceptable level.

Differential integrator 64 may comprise the first stage of a current mode operational amplifier such as a Norton Model No. LM 359 operational amplifier while filter 58 may comprise a simple RC filter designed to remove voltage peaks while retaining suitable voltage levels for voltage outputs 80, 81 to permit measurement. Amplifier 62, which provides approximately 10× amplification, comprises the second half of the Norton LM 359 operational amplifier using a single supply voltage with the amplifier biased so that the output quiescent level is approximately one half of the supply voltage to provide AC coupling at both the amplifier input and output to DC isolation and drift stability. Peak detector circuit 64, which is used both to acquire and store current pulses 77, 78 and to output a difference signal, has a TL084 FET Input Quad Operational Amplifier to both positive and negative peak detection with a 741 operational amplifier employed as a difference amplifier to provide a ground referenced output for reading by meter 66. Meter 66 may comprise a Simpson model 461 digital voltmeter.

It will be understood that modulator 14 is dispensed with where laser 10 comprises a diode laser. In that event, the image signals are input directly to the control section of the diode laser.

While the invention has been described with reference to the structure disclosed, it is not confined to the details set forth, but is intended to cover such modifications or changes as may come within the scope of the following claims.

We claim:

1. In a system for detecting and measuring fast scan jitter as the scanning beam of a raster output scanner scans across a recording member, said scanner including means for modulating said beam in accordance with a signal input, comprising in combination:
    (a) beam detecting means, said beam detecting means including first and second photosensors in the path of said scanning beam, said first and second photosensors each being adapted to produce a signal pulse as said scanning beam scans thereacross, said signal pulses being substantially equal in the absence of fast scan jitter;
    (b) means for integrating said signal pulses to provide a test signal proportional to the difference between said signal pulses on each sweep of said beam; and
    (c) peak detecting means for comparing the peak to peak variation between said test signals to provide a jitter signal.

2. The system according to claim 1 in which said beam detecting means comprises a dual photodiode detector having said first and second photosensors in side by side juxtaposed relation to one another.

3. The system according to claim 2 including means for mounting said dual photodiode detector in at least one predetermined location astride the path of said scanning beam.

4. The system according to claim 3 in which said scanner includes end of scan detector means in the path of said scanning beam, said dual photodiode detector being combined with said end of scan detector means with said dual photodiode detector upstream of said end of scan detector means whereby said scanning beam scans said dual photodiode detector prior to said end of scan detector means.

5. The system according to claim 2 in which said signal input includes means for generating a predetermined number of test bits for modulating said scanning beam to provide a predetermined number of test pixels as said beam scans across said recording member, means for locating said dual photodiode detector in predetermined position in the path of said beam such that in the absence of fast scan jitter, one half of said test pixels impinge on said first photosensor and one half of said test pixels impinge on said second photosensor.

6. The system according to claim 5 in which said integrating means includes means to ramp the signal pulse from said first photosensor toward one polarity and the signal pulse from said second photosensor toward the opposite polarity whereby in the absence of fast scan jitter said signal pulses neutralize each other and said test signal is zero, said integrating means when said signal pulses are unequal differencing said signal pulses to provide a test signal of one polarity for comparison by said peak detecting means with the maximum previous test signal of the opposite polarity.

7. The system according to claim 6 including filter means for removing voltage peaks in said test signal prior to output to said peak detecting means.

8. The system according to claim 7 including amplifier means for amplifying said test signal prior to output to said peak detecting means.

9. The system according to claim 8 including meter means for providing a visual readout of said jitter signal.

10. A method for detecting and measuring fast scan jitter in a raster output scanner having a scan beam modulated in accordance with a pixel input, and means for scanning said beam across a recording member a scan line at a time to provide an image corresponding to said pixel input, comprising the steps of:
    (a) generating a predetermined number of test signals;

(b) repeatedly modulating said beam in response to said test signals to produce a preset number of test pixels along successive scan lines;

(c) sensing the intensity of said test pixels at two predetermined points along said scan line and producing first and second signal pulses in response thereto;

(d) integrating said first and second signal pulses with one another to provide a test signal proportional to the difference between said first and second signal pulses; and (e) comparing the maximum high test signal obtained with the maximum low test signal obtained over a plurality of scan lines to detect and provide a measurement of fast scan jitter.

* * * * *